Feb. 28, 1928.
J. FIELDING
1,660,438
FLEXIBLE BRACELET
Filed May 20, 1925
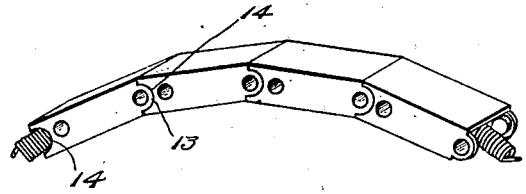
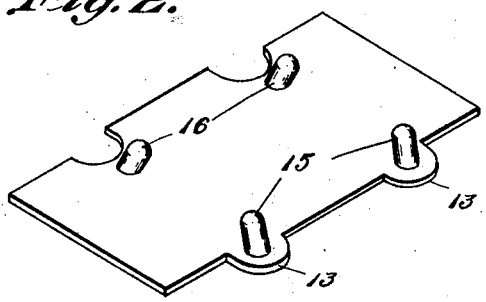
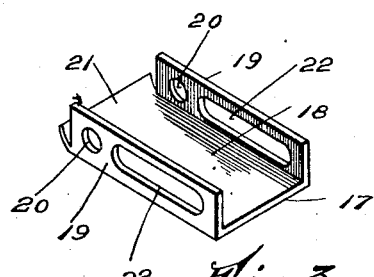
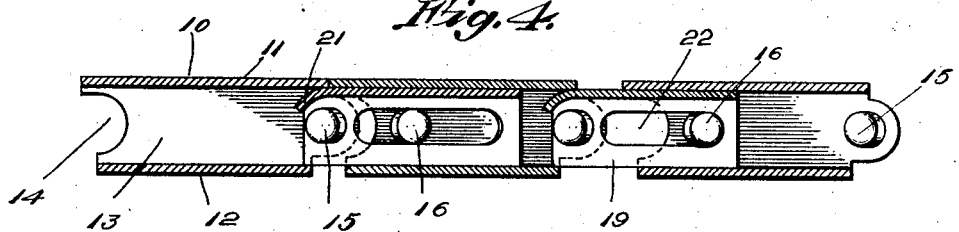
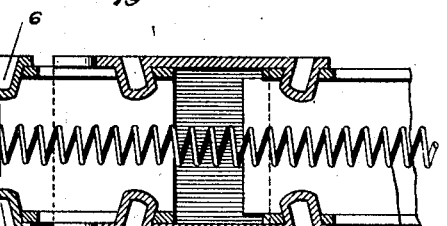
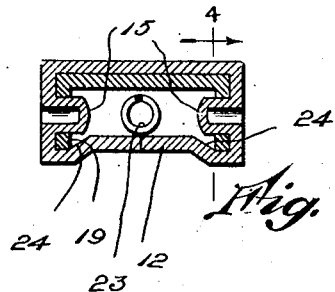
INVENTOR.
John Fielding,
BY
Barlow & Barlow
ATTORNEYS.

Patented Feb. 28, 1928.

1,660,438

UNITED STATES PATENT OFFICE.

JOHN FIELDING, OF NORTH PROVIDENCE, RHODE ISLAND, ASSIGNOR OF ONE-HALF TO JOSEPH P. WHITAKER, OF WARWICK, RHODE ISLAND.

FLEXIBLE BRACELET.

Application filed May 20, 1925. Serial No. 31,519.

This invention relates to an improved construction of flexible bracelet, and has for its object to provide a bracelet of this character formed of a series of box links having a series of connecting links housed in the box links and one end of each box link being pivoted to one end of the next adjacent connecting link, whereby the bracelet is flexible to shape itself to the arm of the wearer.

A further object of this invention is the mounting of the connecting link so that it will slide in the box link and the provision of abutments in the connecting link, and the box link in which it is housed, whereby one may be slidably extended relatively to the other for the purpose of enlarging the operating length of the bracelet, in which case a spring is arranged to act upon the links to normally hold them in contracted position.

A still further object of this invention is the provision of inwardly projecting lugs formed in the side walls of the box links, one pair of these lugs being adapted to serve as pins to pivotally connect the box links with the connector link and another pair of lugs being arranged to engage abutments in the connector links housed in the box links to limit the sliding action between them.

The invention further consists in the setting of the rear wall of this box link inwardly to form grooves for the side of the connecting link to prevent these side walls from springing inwardly and away from the pivot lugs and stop lugs which connect them, this construction being used more particularly when the links are formed from very thin stock as when made of gold, platinum, and of the more expensive metals.

The invention still further consists in the forming of the pivot lugs and stop lugs on an acute angle to the side wall of the box link to act somewhat in the capacity of a hook so that when the links are under strain and extended these lugs will engage and have portions overlying the walls of the connector link so as to prevent a springing apart or separating action of the walls of the box links and their contained connector links to effectually prevent the links from being pulled apart by springing their side walls out of engagement with their connecting lugs.

With these and other objects in view, the invention consists of certain novel features of construction, as will be more fully described, and particularly pointed out in the appended claims.

In the accompanying drawings:

Figure 1 is a perspective view showing a plurality of links of my improved construction as connected together and also showing the end portions of the spring as extending through all of these links serving to normally hold them in contracted position.

Figure 2 is a perspective view illustrating the blank from which the outer or box link is formed by a folding operation; also showing the sets of lug members as formed from the stock thereof.

Figure 3 is a perspective view showing the under side of the connector link.

Figure 4 is an enlarged sectional side elevation showing some of the box links in contracted position with a connector link housed therein also showing one of the box links in extended position with a portion of the connector link exposed in the space between the two separated box links.

Figure 5 is a sectional plan view showing the links in the same relative positions as those in Figure 4, and illustrating the angularly-disposed lugs in the side walls of the box links as engaging the stock of the side walls of the connector link when in extended position.

Figure 6 is a sectional end view on line 6—6 of Figure 5.

It is found in the practical construction and operation of flexible bracelets of this character, of advantage to provide a series of box-shaped links and connecting them together by a series of connector links slidable in the box links also to form inwardly-extending lugs in the side walls of the box links by which these box links are pivotally connected to the connector links and to provide a continuous coiled spring extending through all of the links and attached to the opposite end members of the links to permit an extendible action between the box links and the slide or connector links. It is also found of advantage to provide means for preventing a separating action between the side walls of the box links and those of the connector links to prevent them from springing apart and out of engagement with their connecting lugs while in extended position and under severe strain, which construction is advantageous particularly when the links are formed of very thin metal such as when made of gold, platinum, or of the other expensive metals; and the following is a detailed description of the present embodiment of my invention showing one means by which these advantageous results may be accomplished:—

With reference to the drawings, 10 designates the box-shaped link which is preferably folded up from a blank which is best illustrated in Figure 2 so as to have a top wall 11, bottom wall 12 and side walls 13.

These side walls at one end of the box are each provided with pivot ears 13 which are preferably formed on the arc of a circle, the opposite ends of these side walls being correspondingly recessed as at 14 to receive the pivot ears 13 of the next adjacent box link. These ears 13 are each provided with inwardly-extending integral pivot pins or lugs 15 of a length to project inwardly a distance greater than the thickness of the stock of the connecting member. Also, I preferably provide a pair of abutments 16 in the side walls on each of these box links for the purpose, presently described.

Slidably mounted in these box links is a channel shaped connecting link 17, each having a top wall 18, and side walls 19. These side walls are pierced as at 20 to receive the pivot pins or lugs 15 of the box links, and the top wall at its pivoted end is provided with an extending portion 21 preferably rounded over on the arc of a circle about the pivot center so as to permit an inwardly swinging movement between the box links to render the bracelet flexible.

The side walls of this connecting lug are also preferably slotted as at 22 to receive the abutment lugs 16 so as to limit the relative extending sliding motion between the box link and the connecting link.

In order to normally hold these box links and their connector links in contracted position, I have mounted an elongated coiled spring 23 to extend through these box links and their connectors from end to end of the bracelet and the ends of which spring may be connected together when the bracelet is a continuous band for encircling the wrist, but when employed as a watch bracelet having connecting hooks at its ends, the ends of this spring may be connected to these hook members by any suitable means (not shown), in order to exert a contracting tension upon the links of the bracelet.

In some instances, where these bracelet links are formed of very thin stock such as gold or platinum, it is found of advantage to provide means for preventing the side walls of the outer box links from spreading outwardly and also to prevent the walls 19 of the connector member from bending inwardly when under a heavy separating strain. One means for preventing the inner walls from springing inwardly off from their pins or lugs, is to offset inwardly the rear wall 12 of the box link providing abutment portions 24 on this rear wall of the link, thereby preventing the inward springing of the side walls 19 of the connector member away from the side wall of its box link.

Another means of assisting in the separating of the side walls of the outer box member and the connector member, is by setting both the pivot pins 15 and the abutment or stop lugs or pins 16 on opposite acute angles to the plane of the side walls of the outer link, whereby when extended these lugs and pivot pins will overhang the abutting walls of the connector member and so prevent a spreading or separating action between them.

My improved form of construction of bracelet is very simple, practical and is strong and durable, and by its construction it may be made flexible without being made extendible by simply omitting the slot 22 in the side wall of the connector member.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A flexible bracelet comprising a series of box links having top and side walls, a series of connector links slidable in the box links and having top and side walls, the latter walls being arranged to slide in close contact with those of the box links, pivotal studs connecting one end of said box link to the connector link in the next adjacent box link, said pivotal studs having portions overlying the inner surface of the inner side wall for preventing separation of the adjacent side walls of the two links when the bracelet is under tension.

2. A flexible bracelet comprising a series of box links having top, bottom and side walls, a series of connector links slidably housed in said box links and having top and side walls, the latter walls being arranged to slide in close contact with those of said box links, one end of the box link being pivoted to the connector link, and abutments in the box link engaging the side walls of the connector link and inclined to overlie the inner surface thereof for preventing the adjacent side walls of the two links from springing away from each other under a bracelet elongating strain.

3. A flexible bracelet comprising a series of box links having top, bottom and side walls, a series of connector links slidably housed in said box links and having top and side walls, the latter walls being arranged to slide in close contact with those of said box links, one end of the box link being pivoted to the connector link, the bottom of said box being raised to form abutments for engaging the side walls of the connector link for preventing the adjacent walls of the two links from springing away from each other under a bracelet elongating strain.

4. A flexible bracelet comprising a series of box links having side walls, a series of connector links slidably housed in said box links and having side walls with eyes adjacent one end, one end of each box link having pivot lugs extending into corresponding eyes in the connector link, a slot in the side wall of one of said links spaced from said eye, and a pin in the side wall of the other of said links extending into said slot to limit their relative sliding movement, and a spring acting to press the links to contracted position.

In testimony whereof I affix my signature.

JOHN FIELDING.